United States Patent Office 2,987,826
Patented June 13, 1961

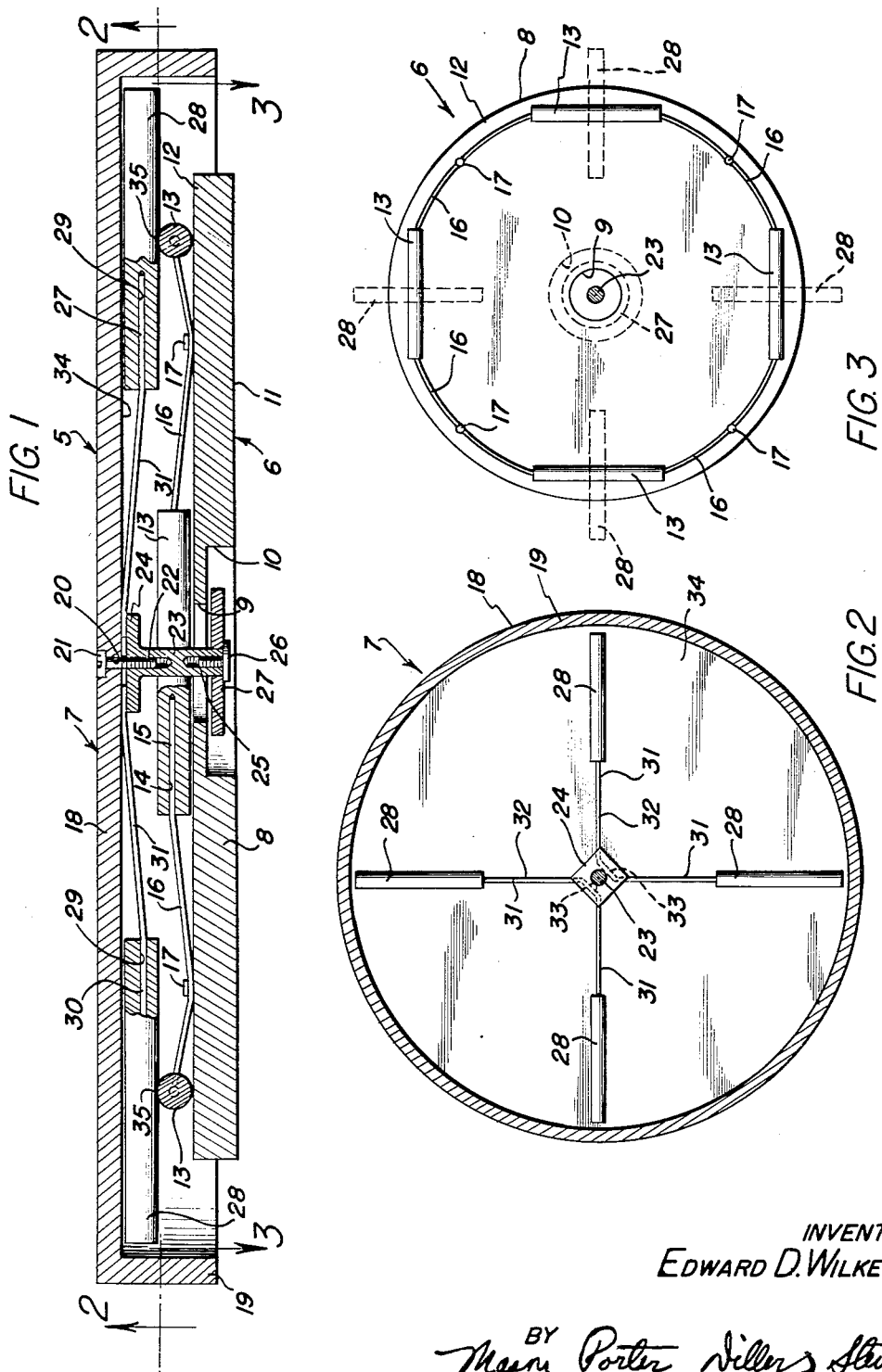

2,987,826
VEHICLE WHEEL SUPPORTING TURNTABLE
Edward D. Wilkerson, 280 E. Northfield Road,
Livingston, N.J.
Filed Sept. 24, 1958, Ser. No. 762,987
5 Claims. (Cl. 33—203)

This invention relates generally to apparatus for testing vehicle wheel alignment and primarily seeks to provide a novel turntable structure to support a vehicle wheel so that it can be freely turned from side to side and also move universally, forwardly and laterally incidental to such turning during the making of various tests for alignment and the like, being comparable in function and purpose to applicant's U.S. Letters Patent 2,648,139.

Applicant's patent mentioned above has generally proved satisfactory for the purpose intended. However, in devices of the character involved, it has been found highly desirable to utilize a relatively light metal, inasmuch as such devices must be constantly handled by the mechanics, and when constructing the devices of a metal such as aluminum, for example, it has been found that roller bearings will seriously score the soft metal, resulting in excessive maintenance and wear.

A purpose of the present invention is to provide a turntable structure affording all of the desirable features attained by applicant's U.S. Letters Patent mentioned above and which includes structure providing an increased bearing surface reducing maintenance and repair and which is simple and may be inexpensively manufactured and so constructed as to avoid the objectionable characteristics of similar prior art devices.

It is well known that in the establishment and maintenance of proper wheel alignment in automotive vehicles, tests with respect to kingpin inclination, camber, caster, toe-in and toe-out and steering geometry are made, and that in making of such tests a part of the procedure is to swing the wheels a certain number of degrees in both directions from the straightaway after application of suitable gaging devices. Due to the peculiar mounting of the wheels in provision of the desired camber, caster and toe-in and toe-out, the support contacting surfaces thereof do not turn about fixed points but partake of an eccentric or planetary movement, causing said contacting surfaces to frictionally drag over or scuff the supporting surfaces and bring about faulty readings on the gaging devices. Thus, it is an object of the present invention to provide a novel form of turntable whereupon a wheel may be received on a turnplate for alignment testing purposes and which is free to move in any direction with the wheel as it is being swung about incidental to making the tests, thereby assuring against any dragging or scuffing of the tires which would give rise to faulty readings on the gaging devices.

The invention in more detail resides in providing a wheel supporting turntable structure of the character stated comprising a supporting base plate having mounted thereon a turnplate freely movable in the manner mentioned above, the base and turnplate including cooperating anti-friction bearings having linear contact with adjacent surfaces of the respective plates to reduce wear thereon, and said bearings having a tangential engagement which facilitates relative movement between the plates for the purpose mentioned.

Another object of the invention is to provide a turntable structure of the character stated wherein, the base and turnplates include cylindrical roller bearings linearly engaged with cooperating surfaces of the respective plates and tangentially engageable with each other, whereby the roller bearings support a proportionate share of the load of a supported vehicle wheel regardless of any natural warping and twisting of the plates when subjected to a load.

With the above and other objects in view that will hereinafter appear, the nature of the invention will be more clearly understood by reference to the following description, the appended claims and the several views illustrated in the accompanying drawings.

In the drawings:

FIGURE 1 is a diametrical section through the novel turnplate structure with portions of the roller bearings broken away and shown in section for purposes of clarity.

FIGURE 2 is a horizontal cross section, on a reduced scale, taken on the line 2—2 of FIGURE 1.

FIGURE 3 is a horizontal section, on a reduced scale, taken on the line 3—3 of FIGURE 1, showing by means of phantom lines the upper roller bearings of the turnplate of the invention.

In the preferred embodiment of the invention herein disclosed, the improved vehicle wheel supporting turntable is indicated generally at 5 and comprises a supporting base plate, generally designated at 6, and a turnplate generally designated at 7.

The supporting base plate 6 comprises a flat plate 8 of any suitable lightweight material and is preferably of a generally circular shape. Extending centrally through the plate 8 is an enlarged circular opening 9 communicating with an annular undercut portion 10 opening into the lower surface 11 of the plate. Chordally engaging the upper surface 12 of the plate 8 are cylindrical roller bearings 13 disposed at 90 degree intervals in diametrically opposed parallel pairs. The bearings 13 have formed therein and opening into their opposite ends longitudinal blind bore portions 14 (FIGURE 1) which slidably receive therein the end portions 15 of circumferentially extending resilient mounting wire elements 16 each of which is intermediately secured to the upper surface 12 of the plate by means of a suitable fastening element 17. When the turnplate 7 is moved, for example, from right to left, as viewed in FIGURE 3, the left-hand roller bearing 13 and the right-hand roller bearing 13 will roll to the left on the base plate 6. Since the ends of the wire elements 16 are slidably positioned in the roller bearings 13, and since intermediate portions of the wire elements are fastened to the base plate 6, when the left-hand roller bearing 13 moves to the left, the ends of the associated wire elements 16 are moved thereout of and the left ends of the wire elements 16 will be deformed to a more flattened state. At the same time, the movement of the right-hand roller bearing 13 to the left will result in the movement of the end portions of the associated wire elements 16 into this roller bearing and the deformation of the right-hand ends of the wire elements to a more curved state.

The turnplate 7 comprises a flat body 18 having a generally circular shape, including a peripheral skirt or flange 19 which will aid in protecting against the entry of foreign matter between the plates and bearing structure. Centrally of the plate 18 there is formed a suitable transverse bore portion 20 receiving therein a machine screw 21. The lower threaded end of the screw 21 extends into an internally threaded bore portion 22 of a mounting hub or shaft 23 which includes a rectangular upper transverse clamping plate portion 24 for a purpose which will later become apparent. The lower end of the hub 23 includes an internally threaded bore portion 25 receiving therein a retaining screw 26 having an enlarged head upon which rests a retaining plate 27. The plate 27 is disposed within the undercut portion 10 of the plate 8, the lower end of the hub 23 extending through the opening 9 thereof. The plate and hub have clearance to permit the necessary movement of the turnplate relative to the supporting base plate for attaining the various adjustments during wheel alignment operations.

The plate 18 has retained to the under surface thereof cylindrical roller bearings 28 extending radially from the center of the plate 18 in axially aligned pairs, (FIGURE 2) the inwardly extending ends of the bearings 28 including a longitudinal aligned bore portion 29 (FIGURE 1) receiving therein and journalled on the end 30 of a leg 31 of a support wire 32. The legs 31 of the support wire are connected by means of an angularly related bight portition 33 (FIGURE 2) which is clamped between the clamping plate portion 24 of the hub 23 and the adjacent under surface portion of the plate 18. If desired, the upper surface of the clamping portion 24 may have formed therein suitable grooves for accommodating therein portions of the legs 31 and the connecting portion 33 therebetween to insure positive orientation of the cylindrical bearings 28.

It will be noted that the cylindrical bearings 28 have a linear contact with the under surface 34 of the plate 18 and will thus afford an appreciable bearing surface far surpassing that afforded by ball bearings. The roller bearings 13 also have a linear contact with the upper surface 12 of the plate 8 and likewise afford an appreciable bearing surface therewith. The cylindrical bearings 13 and 28 cross in the manner shown in FIGURES 1 and 3 and thus have tangential engagement at 35. Thus minimum friction will occur between such bearing points when the plates 8 and 18 are moved relative to each other. In order to inspect the bearings and surfaces engaged thereby on the plates 8 and 18, the turntable may be disassembled by removing the machine screw 21 whereby the hub may be withdrawn through the opening 9 of the plate 8, and the parts may be separated and inspected. Reassembly of the parts may be accomplished by realigning the wires 32 beneath the clamping plate portion 24 and remounting of the machine screw 21.

It is to be understood that turntables such as are illustrated in detail in the accompanying drawing may be used as a pair for simultaneously supporting both of the front wheels of a vehicle when wheel alignment and adjustment is being accomplished.

While one form of the invention has been shown for the purpose of illustration, it is to be clearly understood that various changes in the details of construction and arrangement of parts may be made without departing from the spirit of the invention as defined in the appended claims.

I claim:

1. A vehicle wheel supporting turntable structure comprising, a supporting base plate, a turnplate mounted on said base plate, and a plurality of mutually contacting anti-friction bearing pairs interposed between said plates for permitting free rotary and planetary movement of said turnplate over the base plate, said bearings having linear contact with opposed surface portions of the plates and having tangential contact with each other in each pair.

2. The structure of claim 1 in which said bearings comprise cylindrical roller bearings, certain of said bearings being journalled on one of said plates in chordal relation to the center thereof, and other of said bearings being journalled on the other of said plates in radially extending relation from the center thereof, said roller bearings being disposed in tangentially engaged overlying pairs.

3. The structure of claim 2 including circumferentially disposed resilient mounting wires secured to the upper surface of said base plate upon which said certain bearings are journalled and chordally disposed, and resilient mounting wires on the under surface of said turnplate upon which the other of said bearings are journalled and radially disposed.

4. The structure of claim 1 in which said turnplate includes a peripheral depending skirt surrounding the periphery of said base plate for deterring the entry of foreign matter between said plates.

5. The structure of claim 1 in which there is included means attaching the turnplate to the base plate against separation and for movement of the turn plate relative to the base plate in a generally horizontal plane.

References Cited in the file of this patent

UNITED STATES PATENTS

| | | |
|---|---|---|
| 2,061,326 | Morse et al. | Nov. 17, 1936 |
| 2,250,742 | Bennett | July 29, 1941 |